United States Patent
Jung et al.

(10) Patent No.: US 8,515,074 B2
(45) Date of Patent: Aug. 20, 2013

(54) USER KEY ALLOCATION METHOD FOR BROADCAST ENCRYPTION

(75) Inventors: Bae-eun Jung, Yongin-si (KR);
Maeng-hee Sung, Yongin-si (KR);
Weon-il Jin, Yongin-si (KR); Hee-jean Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1281 days.

(21) Appl. No.: 11/648,608

(22) Filed: Jan. 3, 2007

(65) Prior Publication Data
US 2007/0291948 A1 Dec. 20, 2007

(30) Foreign Application Priority Data
Jun. 15, 2006 (KR) .......................... 10-2006-0053840

(51) Int. Cl.
*H04L 9/00* (2006.01)
(52) U.S. Cl.
USPC ........................................... 380/277; 713/171
(58) Field of Classification Search
USPC ......................................... 380/277; 713/171
See application file for complete search history.

(56) References Cited

U.S. PATENT DOCUMENTS

| 7,212,634 B2* | 5/2007 | Briscoe .......................... 380/203 |
| 7,308,583 B2* | 12/2007 | Matsuzaki et al. ............ 713/189 |
| 7,721,089 B2* | 5/2010 | Gentry et al. .................. 713/163 |
| 2004/0249972 A1* | 12/2004 | White et al. .................... 709/243 |
| 2005/0018853 A1* | 1/2005 | Lain et al. ...................... 380/277 |
| 2005/0055546 A1* | 3/2005 | Dzung ............................ 713/151 |
| 2005/0213765 A1* | 9/2005 | Mihaljevic et al. ............ 380/277 |
| 2005/0271210 A1* | 12/2005 | Soppera ......................... 380/277 |

* cited by examiner

*Primary Examiner* — Amare F Tabor
(74) *Attorney, Agent, or Firm* — NSIP Law

(57) ABSTRACT

A user key allocation method for broadcast encryption is provided. The user key allocation method includes generating a plurality of subsets by dividing one group including a plurality of nodes to sub-groups and allocating key sets with respect to the subsets, respectively. The nodes included in the subset may be odd nodes and even nodes of the nodes of the group. The nodes are arranged so that privileged nodes are consecutive or there is only one privileged node. Accordingly, it is possible to reduce the data size transmitted from the server to the nodes by constituting one or more subsets from the nodes consecutively arranged and providing key sets with respect to the subsets.

6 Claims, 6 Drawing Sheets

FIG. 2A

Figure 1:
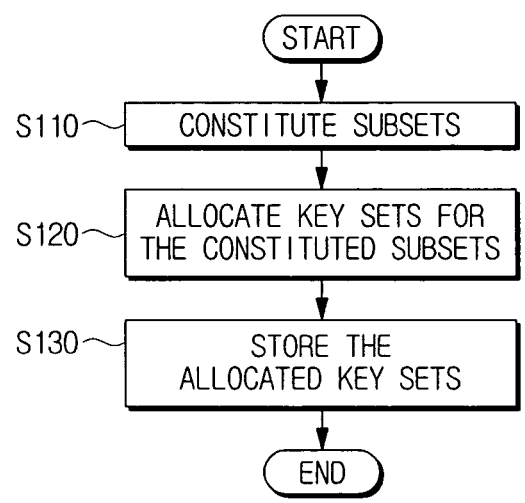

| NODE | 1 | 2 | 3 | 4 | 5 | 6 | 7 | 8 |
|---|---|---|---|---|---|---|---|---|
| KEY SETS | $S1$ | $h(S1)$ | $h^2(S1)$ | $h^3(S1)$ | $h^4(S1)$ | $h^5(S1)$ | $h^6(S1)$ | $h^7(S1)$ |
| | $h^7(S2)$ | $S2$ | $h(S2)$ | $h^2(S2)$ | $h^3(S2)$ | $h^4(S2)$ | $h^5(S2)$ | $h^6(S2)$ |
| | $h^6(S3)$ | $h^7(S3)$ | $S3$ | $h(S3)$ | $h^2(S3)$ | $h^3(S3)$ | $h^4(S3)$ | $h^5(S3)$ |
| | $h^5(S4)$ | $h^6(S4)$ | $h^7(S4)$ | $S4$ | $h(S4)$ | $h^2(S4)$ | $h^3(S4)$ | $h^4(S4)$ |
| | $h^4(S5)$ | $h^5(S5)$ | $h^6(S5)$ | $h^7(S5)$ | $S5$ | $h(S5)$ | $h^2(S5)$ | $h^3(S5)$ |
| | $h^3(S6)$ | $h^4(S6)$ | $h^5(S6)$ | $h^6(S6)$ | $h^7(S6)$ | $S6$ | $h(S6)$ | $h^2(S6)$ |
| | $h^2(S7)$ | $h^3(S7)$ | $h^4(S7)$ | $h^5(S7)$ | $h^6(S7)$ | $h^7(S7)$ | $S7$ | $h(S7)$ |
| | $h(S8)$ | $h^2(S8)$ | $h^3(S8)$ | $h^4(S8)$ | $h^5(S8)$ | $h^6(S8)$ | $h^7(S8)$ | $S8$ |

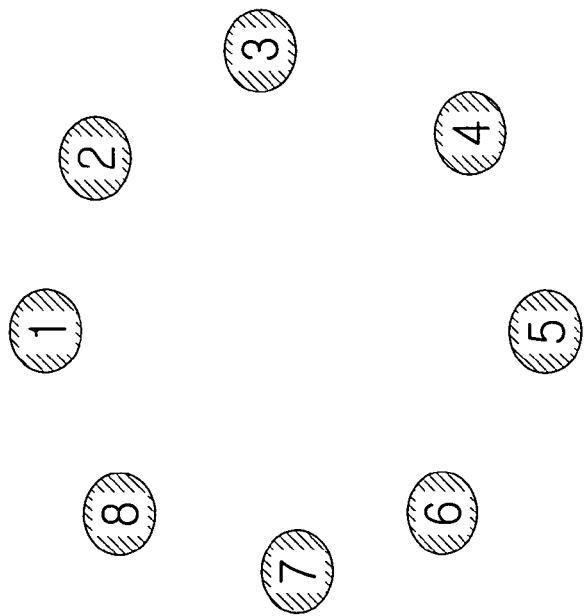

USER KEY ALLOCATION METHOD FOR BROADCAST ENCRYPTION

CROSS-REFERENCE TO RELATED APPLICATIONS

This application claims benefit under 35 U.S.C. §119(a) of Korean Patent Application No. 2006-53840, filed Jun. 15, 2006, in the Korean Intellectual Property Office, the entire disclosure of which is hereby incorporated by reference.

BACKGROUND OF THE INVENTION

1. Field of the Invention

The present invention relates to a user key allocation for broadcast encryption. More particularly, the present invention relates to a user key allocation method which enables only a privileged user to reproduce content when the content is distributed using the broadcast encryption.

2. Description of the Related Art

Recently, a variety of software data (hereafter, referred to as content) such as game programs, audio data, video data, and document preparing programs have become widespread over networks such as the Internet or through distributable memory media such as DVDs and CDs. The distributed content can be stored on a recording device such as a memory card or a hard disc drive of a recording and reproducing device such as personal computer (PC) or video game console owned by a user. Once the content is stored, it is available for reproduction from the storing media.

Typically, the content creator or the content provider has the right to control distribution of the software content such as game programs, music data, and video data. Accordingly, use restriction is imposed on the content distribution. That is, only a qualified user is allowed to use the software and unauthorized copying of the software is blocked. In short, content security is accounted for and controlled through the content distribution.

One means to impose restricted use of the contents is to encrypt the distributed content and give a decryption means to only a privileged user. For instance, when distributing various encrypted contents such as audio data, video data, and game programs over the Internet, the decryption means for the encrypted content, for example a content key, is allocated only to a confirmed privileged user.

In case that a reproduction device is used for illegal duplication and thus revoked, the revoked device should not be considered as a privileged user device. Some broadcast encryption methods can discriminate the illegally duplicated device even after the duplicated device is sold to the user.

The broadcast encryption method transmits the content together with an encryption key block including the content key used to encrypt the content. The user device generates the content key using the received encryption key block and its own user key block.

The broadcast encryption method takes into consideration transmission overhead, storage overhead, and computation overhead which comprise the majority of the key block data. The transmission overhead is a quantity of the transmitted header, the storage overhead is a quantity of the secret key to be stored by the user, and the computation overhead is a quantity of computations required for the user to acquire a session key. Among these, the most important task is to reduce the transmission overhead.

Taking account of the transmission overhead and the storage overhead, diverse broadcast encryption algorithms have been suggested, including complete subtree (CS) method, subset difference method (SD) method, broadcast encryption method using public key cryptography, and encryption method using a hash chain.

However, according to the conventional broadcast encryption methods, when a revoked user is present among the privileged users, the transmission overhead increases in proportion to the increasing number of the user nodes.

Therefore, what is needed is a user key allocation method for broadcast encryption which reduces the transmission overhead even when a revoked user is present.

SUMMARY OF THE INVENTION

Exemplary embodiments of the present invention address at least the above problems and disadvantages and provide at least the advantages described below. Accordingly, exemplary embodiments of the present invention include a user key allocation method for reducing transmission overhead when contents are distributed using a broadcast encryption method.

According to exemplary embodiments of the present invention, a user key allocation method includes generating a plurality of subsets by dividing one group including a plurality of nodes into sub-groups and allocating key sets with respect to the subsets. The nodes included in the subset may be odd nodes and even nodes of the nodes of the group.

The plurality of the subsets may be generated by including k-ary subsets to the one group when the number of the nodes included in the one group is defined as N, based on the following equation:

$$k = \log_2 N.$$

K-ary key sets may be allocated, where k is the number of the subsets.

The subsets may be repeatedly generated until the number of nodes included in the subset equals two.

The user key allocation method may further include storing the key sets allocated for the subsets.

According to another exemplary embodiment of the present invention, a key transmission method includes dividing a plurality of nodes including one group to a set of odd nodes and a set of even nodes such that privileged nodes are consecutively arranged or only one privileged node is left and encrypting confidential information to be transmitted to the consecutive privileged nodes using one key and transmitting the encrypted information.

The dividing of the nodes may include determining whether privileged nodes are consecutively arranged in the set of the odd nodes and the set of the even nodes.

When the privileged nodes are not consecutively arranged according to a result of the determination, the dividing of the nodes may arrange the privileged nodes consecutively by dividing the odd nodes and the even nodes and constituting a subset of odd nodes and a set of even nodes.

The consecutive arrangement of the privileged nodes may be determined when there is no revoked node between the privileged nodes or there is only one privileged node in the nodes included in the sets.

The confidential information may be encrypted with one key and may be transmitted when the consecutive arrangement of the privileged nodes is determined.

The privileged nodes may be consecutively multi-layered. The multi-layer may be constituted until there is no revoked node between the privileged nodes or there is only one privileged node.

The key transmission method may further include setting to discriminate between a privileged node and a revoked node in the plurality of the nodes included in the one group. The privileged nodes may be consecutively arranged based on set information in the setting operation.

The privileged node may be set to 0 and the revoked node may be set to 1.

BRIEF DESCRIPTION OF THE DRAWING FIGURES

Figure 2B:
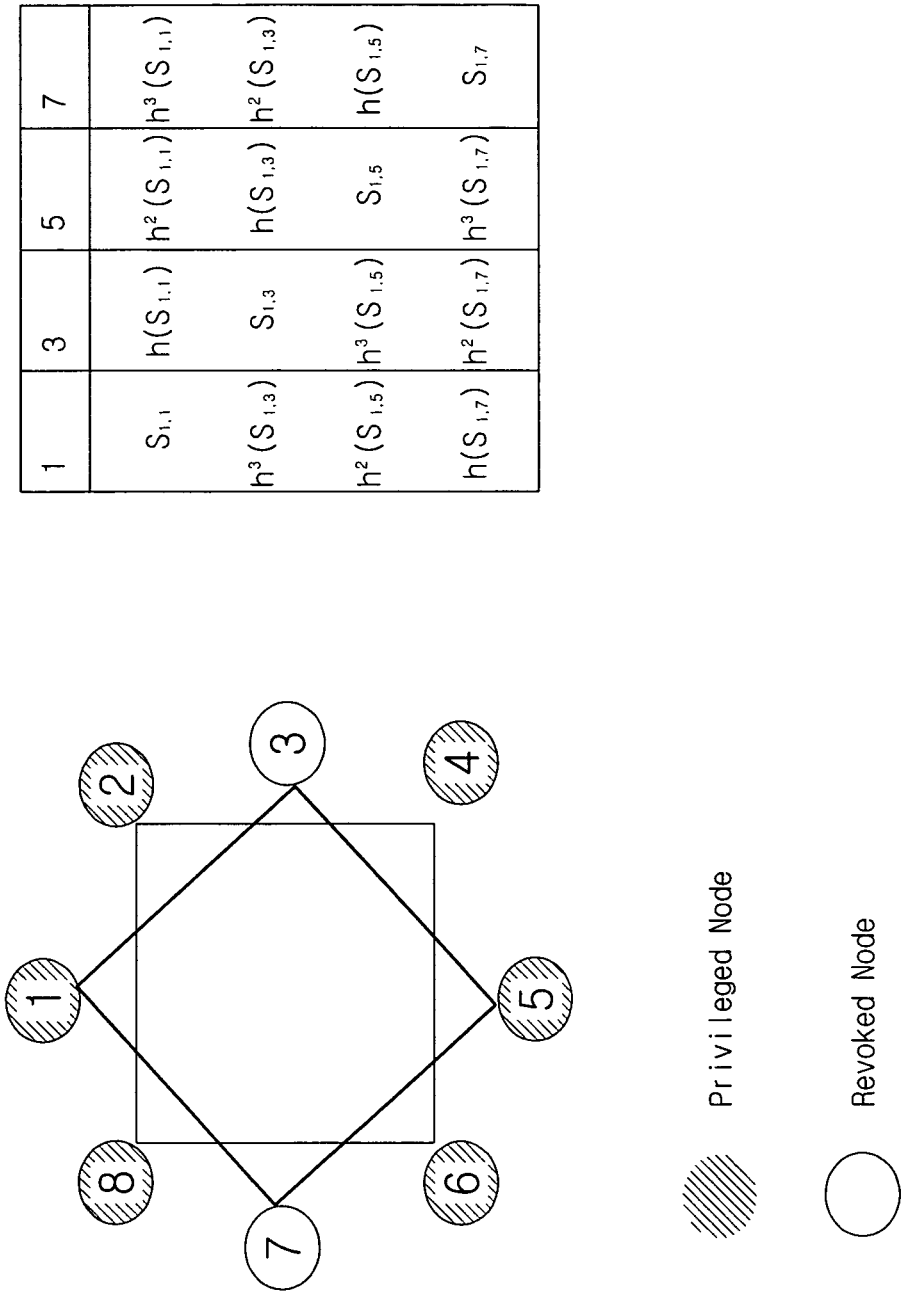
Figure 2C:
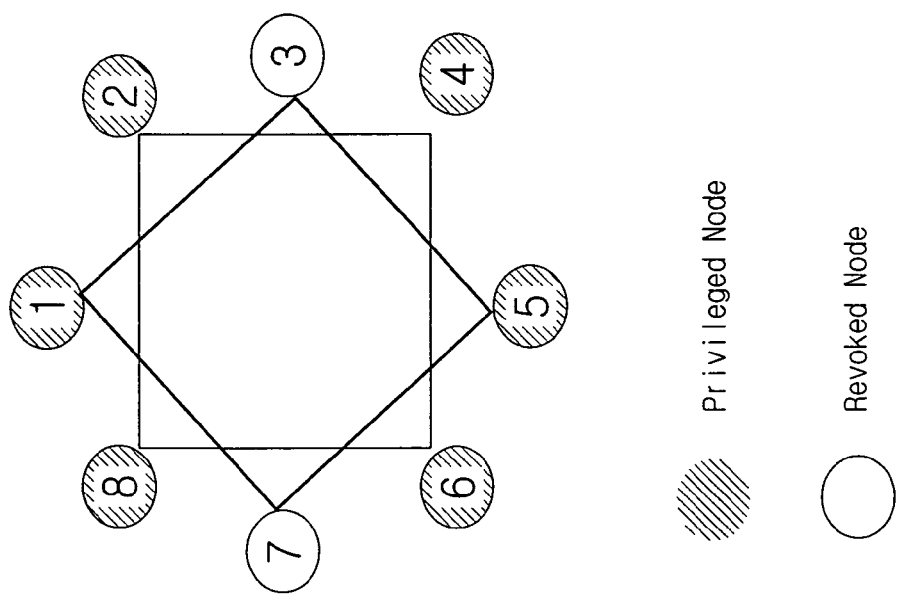
Figure 3:
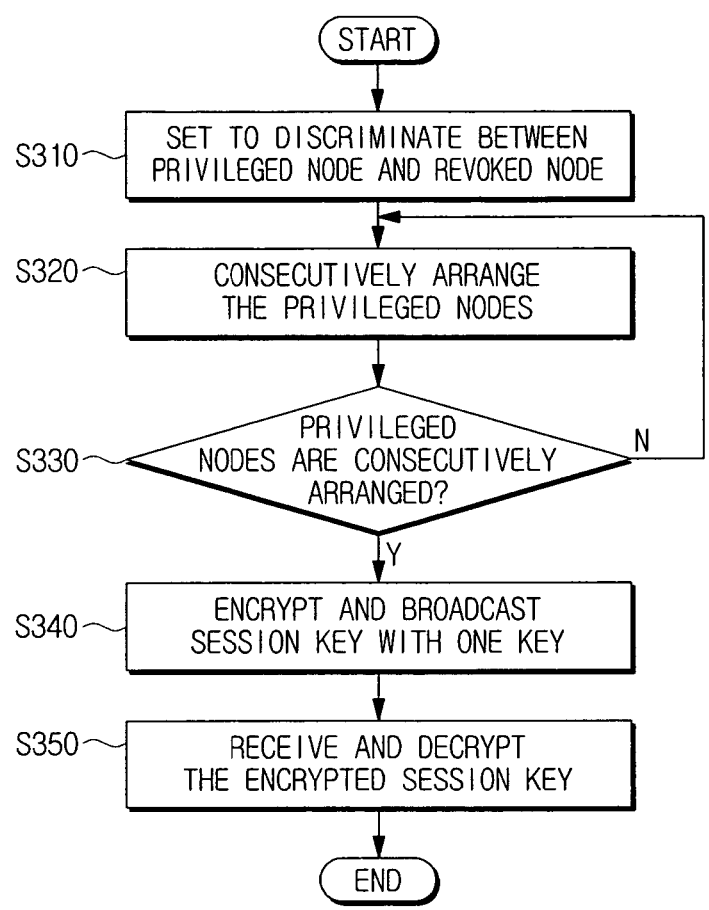
Figure 4:
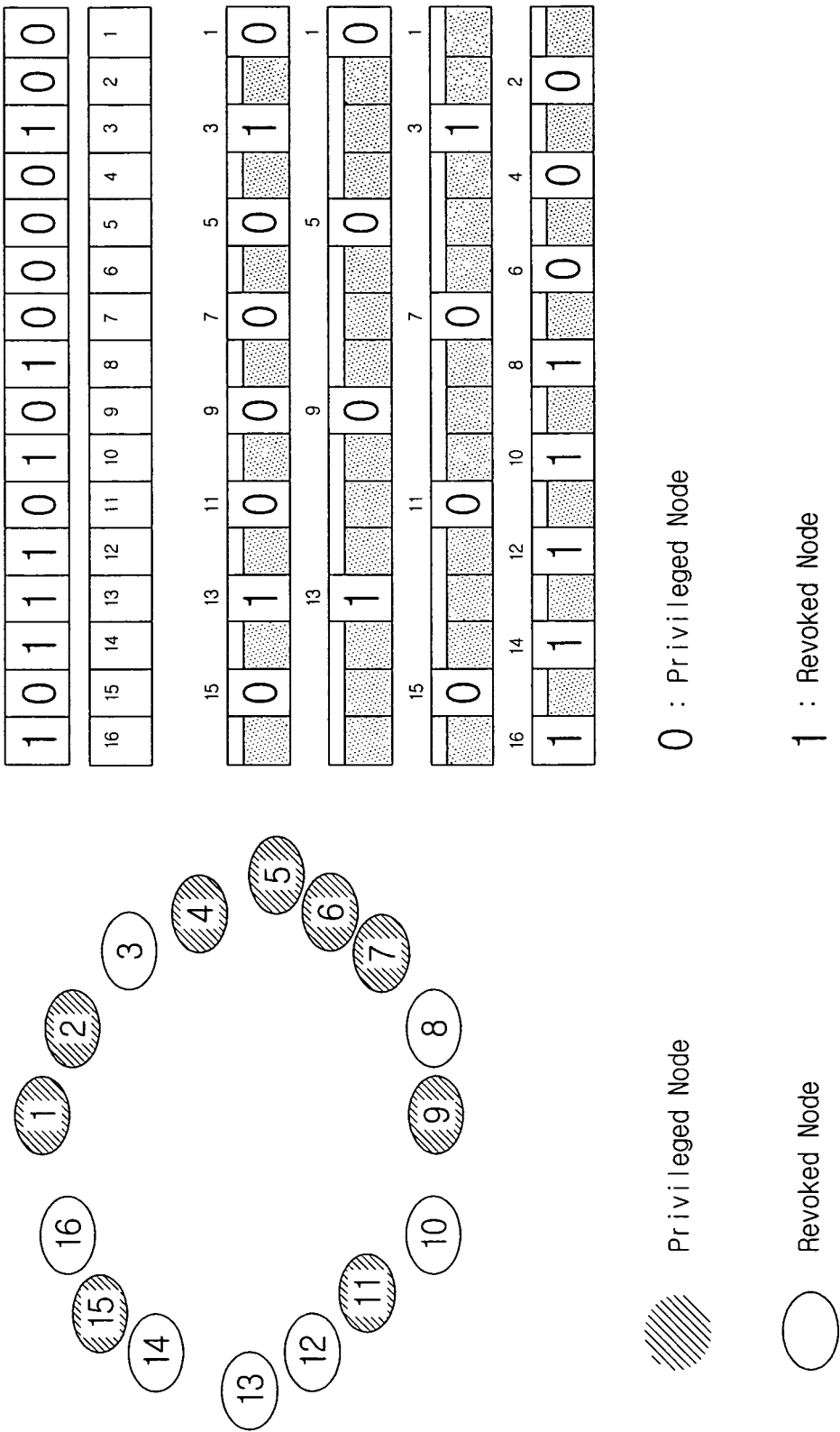

The above and other exemplary features and advantages of the present invention will become more apparent from the following detailed description of certain exemplary embodiments thereof when taken in conjunction with the accompanying drawings, in which:

FIG. 1 is a flowchart outlining a user key allocation method according to an exemplary embodiment of the present invention;

FIGS. 2A, 2B, and 2C are diagrams showing exemplary key sets with respect to subsets stored by a node 1 when the number of nodes is eight according to an exemplary embodiment of the present invention;

FIG. 3 is a flowchart outlining an exemplary session key transmission method of a server according to an exemplary embodiment of the present invention; and FIG. 4 is a diagram showing exemplary grouped nodes that can transmit the session key at the same time according to an exemplary embodiment of the present invention.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

FIG. 1 is a flowchart outlining a user key allocation method according to an exemplary embodiment of the present invention.

Referring to FIG. 1, nodes constituting a group are arranged in a circle. The nodes correspond to users, respectively, in a broadcast encryption system.

The nodes in the circle are divided into subsets (S110). The subsets may be multi-layered.

More specifically, one group may be split into a plurality of sub-groups, that is, subsets. The subsets are constituted based on the following equation:

$$k = \log_2 N \quad \text{[Equation 1]}$$

In Equation 1, k is the number of subsets and N is the number of nodes in the circle. As an example, a circular structure may comprise node 1 through node 8 (N=8). In this example, the number of the circular nodes is eight and, according to Equation 1, the number of the subsets (k) is three.

The subset 1 consists of the N nodes in the circle. The subset 2 consists of odd nodes and even nodes of sets, each set consisting of N/2 members after dividing the members (N) of the subset 1 by two. The subset 3 consists of odd nodes and even nodes of sets, each set consisting of N/4 members after dividing the members of the subset 2 (N/2) by two.

As an example, the members of the subset 1 are {node 1 through node 8}, and the members of the subset 2 are {node 1, node 3, node 5, node 7} and {node 2, node 4, node 6, node 8}. The members of the subset 3 are {node 1, node 5}, {node 3, node 7}, {node 2, node 6}, and {node 4, node 8}. Herein, the node 1 through the node 8 are serial numbers pre-allocated to the nodes, and the odd node and the even node in the subset indicate the serial number of the nodes.

Next, key sets are allocated to the nodes with respect to the generated subsets, respectively (S120).

Each node receives a certain key which is shared by privileged users so that only the privileged users can decrypt confidential information, for example, content. The key sets are allocated for the subsets generated in the operation S110, respectively. For doing so, the key values (key sets) are allocated to the nodes as shown in FIGS. 2A, 2B, and 2C by sequentially applying the keys allocated to the nodes to a one-way hash function.

FIGS. 2A, 2B, and 2C are diagrams showing exemplary key sets with respect to subsets stored by a node 1 when the number of nodes is eight.

Referring to FIGS. 2A, 2B, and 2C, key sets for k-ary subsets generated in the operation S110 are allocated to each node. For example, when the number of nodes is eight (N=8), three key sets are allocated to the respective nodes.

In FIGS. 2A, 2B, and 2C, "h" denotes the one-way hash function. The one-way hash function transforms an input value of an arbitrary length to a fixed-length output value. The one-way hash function has the following properties. It is impossible to calculate an original input value with a given output value. It is impossible to find an output value with a given input value or to find another input value. In addition, it is impossible to find and calculate two different input values that result in the same output value.

The hash function characterized by the above features is one of several important functions applied for data integrity, authentication, repudiation prevention, and the like. In an exemplary embodiment of the present invention, the one-way hash function can be SHA-1. However, the invention is not limited to this exemplary function.

Next, the nodes store the allocated key sets (S130). That is, each node stores the k-ary key sets.

Referring back to FIGS. 2A, 2B, and 2C, each node stores the key sets, allocated in the operation S120, with respect to the subsets. For instance, the node 1 stores the key set 1, the key set 2, and the key set 3 allocated for the subset 1, the subset 2, and the subset 3, respectively.

Note that the user key allocation method of the present invention is not limited to a particular encryption algorithm, and that the generated user keys can be allocated to the nodes in the subsets according to a preset algorithm or an alterable algorithm.

In an exemplary user key allocation method, the key sets allocated by the subsets may be stored in a user device in the operations S110, S120, and S130 when the user device is assembled.

Exemplary descriptions have been provided on the constitution of the subsets by dividing the circular nodes and the key set allocation. Hereafter, an exemplary method for encrypting a session key and broadcasting it to privileged nodes is illustrated in reference to FIGS. 3 and 4.

FIG. 3 and FIG. 4 show an exemplary session key transmission when privileged nodes and revoked nodes are present in the nodes arranged in a circle. To ease the understanding, it is exemplified that the number of the circular nodes is 16

(N=16). In addition, although the nodes are arranged in a circle in FIG. 4, the nodes are aligned to ease the understanding and the arrangement is merely exemplary.

Referring to FIG. 3 and FIG. 4, the server sets to discriminate between a privileged node and a revoked node in the circular nodes (S310).

As shown in FIG. 4, the server sets the privileged node to "0" and the revoked node to "1". Alternatively, the privileged node may be set to "1" and the revoked node may be set to "0". The privileged nodes are node 1, node 2, node 4 through node 7, node 9, node 11, and node 15 in FIG. 4. The other nodes are the revoked nodes.

Next, the server consecutively arranges the privileged nodes of the circular nodes (S320).

Specifically, in FIG. 4, the server constitutes the subsets by dividing the nodes 1-15 into odd nodes (node 1, node 3, node 5, node 7, node 9, node 11, node 13, and node 15) and even nodes (node 2, node 4, node 6, node 8, node 10, node 12, node 14, and node 16). The server determines whether there is a privileged node in the member nodes of the subsets.

The server determines whether the privileged nodes (odd nodes: node 1, node 5, node 7, node 9, node 11, and node 15; even nodes: node 2, node 4, and node 6) are consecutively arranged in the separated odd nodes and the separated even nodes (S330). Note that the odd nodes and the even nodes indicate the locations of the nodes of FIG. 4.

When the privileged nodes are consecutively arranged (S330-Y), the server encrypts a session key (SK) using one key and broadcasts the encrypted key (S340). That is, the server is able to transmit the session key to the consecutive privileged nodes 2, 4, and 6 at the same time.

In an exemplary embodiment, E(S, m) may be a secret key cryptography using the key S. Therefore, the encryption information of the session key for the privileged nodes 2, 4, and 6 can be expressed as Equation 2.

$$\text{encryption information}=E(h^{(t)}(S_j),SK) \quad \text{[Equation 2]}$$

In Equation 2, h denotes the hash function, t denotes the number of nodes, $S_j$ denotes the node key, and SK denotes the session key.

That is, the server encrypts the session key using the value $h^{(t)}(S_j)$ as the key and broadcasts the encrypted key.

By contrast, when the privileged nodes are not arranged consecutively (S330-N), that is, when there is a revoked node between the privileged nodes, the server reconstitutes the subsets.

Subsequent to the operation S320 in FIG. 4, the server divides the odd nodes divided at operation S320 into odd-numbered order nodes and even-numbered order nodes again.

The server repeatedly splits into the odd nodes and the even nodes until the privileged nodes are consecutively arranged or only one privileged node is left. Next, when the privileged nodes are consecutively arranged or only one privileged node is left, the server encrypts the session key (SK) using the value $h^{(t)}(S_j)$ as the key and broadcasts the encrypted key (S340). When there is no revoked node between the privileged nodes, the server determines that the privileged nodes are consecutively arranged.

Next, the nodes receive the encrypted session key and decrypt the encrypted session key using their stored key sets (S350).

Although merely one node group in the circle is illustrated for the user key allocation method for the broadcast encryption in an exemplary embodiment of the present invention, the user key allocation method is applicable to a plurality of node groups.

Certain exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. A transmission medium may also be employed, including carrier waves (such as data transmission through the Internet). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

In light of the foregoing, it is possible to reduce the data size transmitted from the server to the nodes by constituting one or more subsets from the nodes consecutively arranged and providing key sets with respect to the subsets.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims and equivalents thereof.

What is claimed is:

1. A user key allocation method comprising:
generating, by a computer-processor, a plurality of subsets by dividing one group including a plurality of nodes into sub-groups, identifying each node as privileged or revoked, and dividing the nodes in each of the plurality of subsets into sets of even and odd nodes, wherein privileged nodes are consecutively arranged or only one privileged node is left in a set; and
allocating, by the processor, key sets with respect to the subsets, respectively, wherein
the even and odd nodes of the group form a circle being arranged in alternation.

2. The user key allocation method of claim 1, wherein generation of the plurality of the subsets comprises generation by including k-ary subsets to the one group when the number of the nodes included in the one group is defined as N, based on the following equation:

$$k=\log_2 N.$$

3. The user key allocation method of claim 2, further comprising allocating k-ary key sets, where k is the number of the subsets.

4. The user key allocation method of claim 1, further comprising repeatedly generating the subsets until the number of nodes included in each of the subsets equals two.

5. The user key allocation method of claim 1, further comprising:
storing the key sets allocated for the subsets.

6. A non-transitory computer-readable medium having stored thereon instructions for executing a user key allocation method, the instructions comprising:
a first set of instructions for generating a plurality of subsets by dividing one group including a plurality of nodes into sub-groups, identifying each node as privileged or revoked, and dividing the nodes in each of the plurality of subsets into sets' of even and odd nodes, wherein privileged nodes are consecutively arranged or only one privileged node is left in a set; and a second set of instructions for allocating key sets with respect to the subsets, respectively, wherein the even and odd nodes of the group form a circle being arranged in alternation.

* * * * *